Nov. 5, 1968   D. A. PIEPHO ET AL   3,409,335
ADJUSTING MEANS FOR AUTOMATICALLY TENSIONING AN ENDLESS TRACK
Filed Dec. 15, 1966   2 Sheets-Sheet 1
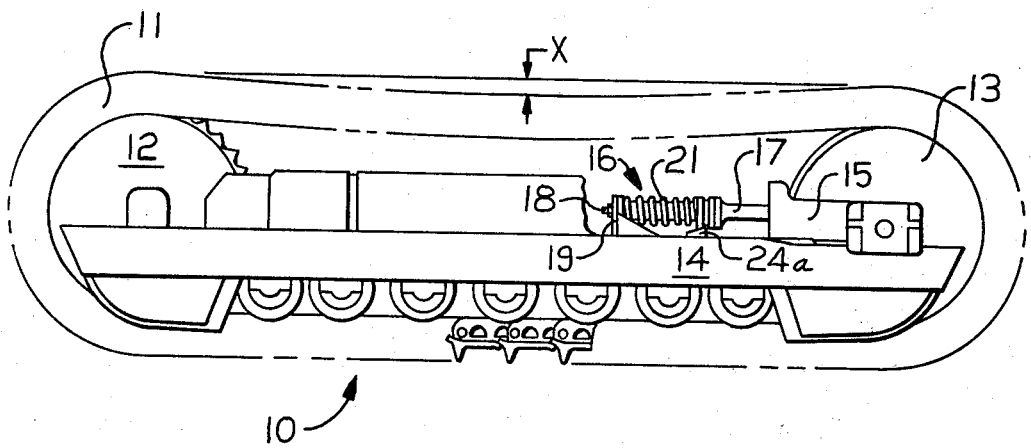
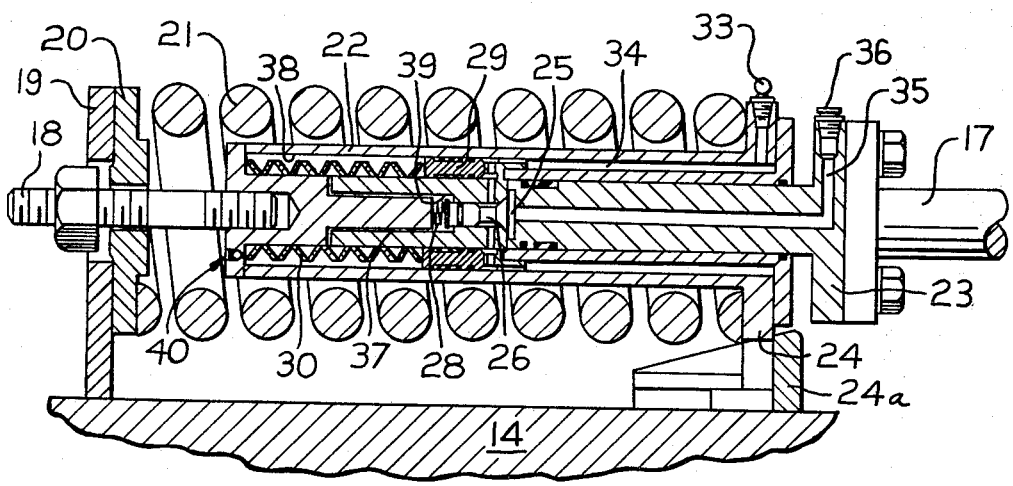
INVENTORS
DONALD A. PIEPHO
SIDNEY J. AUDIFFRED, JR.
BY
ATTORNEYS

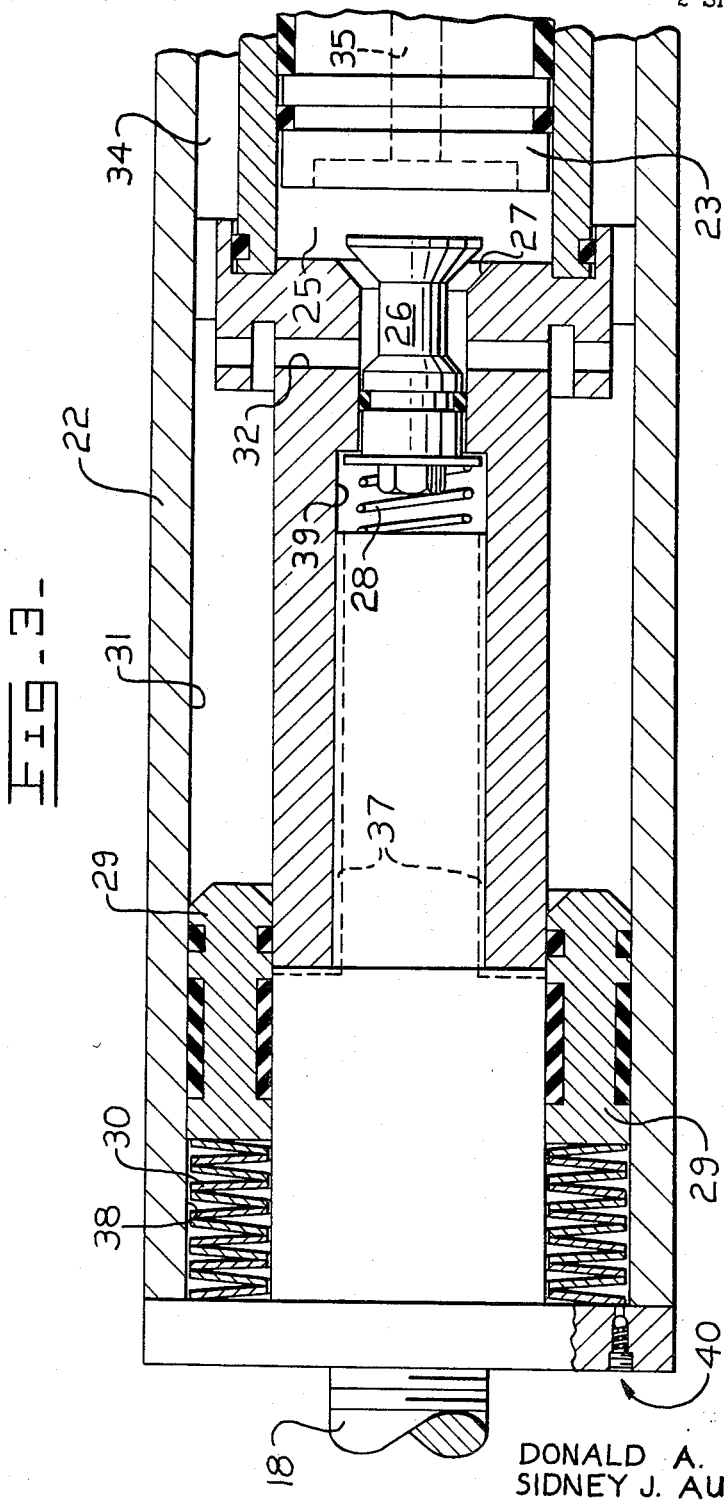

United States Patent Office
3,409,335
Patented Nov. 5, 1968

3,409,335
ADJUSTING MEANS FOR AUTOMATICALLY
TENSIONING AN ENDLESS TRACK
Donald A. Piepho, Aurora, and Sidney J. Audiffred, Jr.,
Peoria, Ill., assignors to Caterpillar Tractor Co., Peoria,
Ill., a corporation of California
Filed Dec. 15, 1966, Ser. No. 601,922
8 Claims. (Cl. 305—10)

ABSTRACT OF THE DISCLOSURE

A track-type tractor comprising an endless track trained about a drive sprocket and an idler has an automatic adjuster operatively connected to the idler to maintain a pre-set tension on the endless track. Such adjuster comprises a valve arranged to automatically open and charge a chamber positioned behind a hydraulically actuated piston connected to the track idler when the fluid pressure in such chamber drops below a pre-set level.

Background of the invention

A problem encountered with the use of track-type tractors is one of continuously maintaining a predetermind tension on the endless tracks thereof during all modes of tractor operation. Normal wear of the tracks and their support sprockets and idlers, over an extended period of time, for example, tends to decrease such tension to thus loosen the tracks. Such loosening could result in having a track disengage itself from its supporting drive sprocket and idler during tractor operation. On the other hand, initial overtightening of the tracks will induce undue wear of the track assemblies, including attendant support pins, shafts and bushings.

Conventional endless track arrangements require constant manual adjustment or associated pump means responsive to relative movement occuring between a track idler and the tractor's frame to maintain a predetermined tension on the tracks. U.S. Patents 1,861,866 2,452,671 and 2,818,311 describe prior art endless track arrangements of this type.

Summary of the invention

Objects of this invention are to provide a self-contained and compact adjusting means for automatically and continuously maintaining a pre-set tension on an endless belt, preferably the endless track of a track-type tractor. Such adjusting means eliminates the need for constant manual track adjustment or pump mechanisms responsive to relative movement occurring between the track idler and the tractor's frame during tractor operation for track tensioning purposes. In addition to such objects, the adjusting means of this invention is economically constructed and arranged, may be readily installed on conventional tractors, and is conducive to expeditious servicing.

The preferred adjusting means comprises pressurizing means, such as a spring-loaded accumulator, for maintaining a high fluid pressure level in a first chamber means. A second chamber means having fluid pre-set and maintained therein at a relatively low pressure level is arranged to urge the track idler to set the tension on the endless track. When the pressure in the second chamber means drops below such low pressure level, a valve, opens automatically to communicate the two chamber means only until such low pressure level is again achieved.

Further objects and novel aspects of this invention will become apparent from the following description and drawings.

Brief description of the drawings

FIG. 1 is a side elevational view of an endless track assembly for a track-type tractor;

FIG. 2 is an enlarged cross-sectional view of a structurally integrated recoil mechanism and track adjusting mechanism employed in the track assembly of FIG. 1; and FIG. 3 is an enlarged, cross-sectional view more particularly disclosing the track adjusting mechanism illustrated in FIG. 2.

Description of the preferred embodiment

The track assembly 10 illustrated in FIG. 1 comprises an endless belt 11, preferably in the form of a track, suitably trained about a drive sprocket 12 and a track idler 13 in a conventional manner. The idler is slidably mounted on a frame 14 of the tractor by means of a yoke 15 which rotatably mounts the idler. The yoke is operatively connected to the first end of a track adjusting means 16 via a rod 17 attached thereto. An adjustable bolt 18 attaches the other end of the mechanism to an upstanding bracket 19 secured to frame 14 via washer 20. As more clearly illustrated in FIG. 2, bolt 18 is arranged to engage washer 20 which is arranged to compress a conventional recoil means 21, preferably in the form of a spring. In particular, the bolt threadably engages a multi-part housing or cylinder 22, slidably mounted relative to a reciprocable piston 23 substantially contained therein.

A radially extending flange 24 of the housing guided and restrained in a forward direction by stops 24a bolted solidly to the frame 14, is arranged to place the recoil spring 21 under a pre-set compression. Thus, when the tractor moves rightwardly as viewed in FIG. 1 and encounters an immovable object or the like, or should a solid foreign object such as a rock or log become lodged between the track 11 and the sprocket 12 or idler 13, rod 17 will move piston 23 and thus housing 22 leftwardly to compress spring 21 between washer 20 and flange 24. During such relative movement, washer 20 will abut bracket 19 and the shank of bolt 18 will be permitted to move freely through aligned apertures formed in the washer and bracket. Thus, any such shock imparted to the tractor will be absorbed by recoil spring 21 in a substantially conventional manner.

The preferred adjusting means for positioning rod 17 relative to housing 22, i.e. idler 13 relative to drive sprocket 12, to adjust the slack x of track 11 (FIG. 1) is more clearly disclosed in FIG. 3. In particular, a suitably sealed chamber means 25 is arranged to be charged with a pressurized fluid through a reciprocal valve means or spool 26, urged off its seat 27 by a light spring means 28. It can be seen that when the valve means is arranged in its seated position (FIG. 2) that the fluid pressure level in chamber 25 will dictate the extent to which rod 17 is extended relative to housing 22.

The pressurizing means for automatically charging chamber means 25 when the fluid pressure therein drops below a pre-set level preferably comprises a cylindrically shaped accumulator piston 29, slidably mounted on a tubular portion of housing 22. The accumulator is arranged to be urged rightwardly by spring means 30, preferably in the form of a stack of Belleville type springs. Thus, the pressurizing means is adapted to maintain a substantially constant high pressure level in a suitably sealed chamber means 31 which may be communicated into chamber means 25 via passages 32 when valve 26 is opened to its FIG. 3 position.

Referring to FIG. 2, disclosing the adjusting means in its relaxed or non-charged condition of operation, first the entire system is charged initially with a fluid, such as a standard grease having a low viscosity. The fluid is introduced through a suitable fitting 33 and through an annular passage 34 into chamber means 31 and into the adjusting piston chamber 25 via passages 32 and past valve 26, which is held open by spring 28 in its relaxed state. As the charging is continued, piston 23, rod 17, yoke 15, and idler 13 will be urged rightward until the track 11 is tightened to a predetermined slack $x$, illustrated in FIG. 1. At this time, the pressure in chamber 25 will have increased to a predetermined level, for example 2900 p.s.i., and this pressure will close valve 26 against spirng 28 on seat 27.

Continued charging will raise the pressure level in first chamber means 31 to approximately 4400 p.s.i., for example, under the influence of accumulator piston 29. Fitting 33 may then be sealed to permit the closed system to function automatically to thereafter constantly maintain the fluid pressure in second chamber means 25 at the pre-set 2900 p.s.i. level. Thus, piston 23, rod 17, yoke 15 and idler 13 will be urged rightwardly continuously by such pressure to maintain a pre-set tension on track 11, illustrated in FIG. 1 by slack $x$.

In operation, it can thus be seen that valve means 26 will open automatically to constantly maintain the fluid pressure level in second chamber means 25 at 2900 p.s.i. In particular, when the fluid pressure therein drops below such level, make up fluid pressure will be communicated from first chamber means 31 to second chamber means 25 primarily due to the effective shape of the valve means and the biasing force exerted on the valve means by spring 28.

After piston 23 has moved rightwardly (FIG. 2) to its maximum adjusted position, established previously for the estimated normal life expectancy of the track assembly, chamber means 25 may be emptied via passage means 35 which is normally closed by a fitting 36. Lowering of the fluid pressure level in chamber means 25 will permit valve 26 to open under the influence of spring 28 to also drain accumulator chamber 31 via passages 32.

It should be noted further that after accumulator piston 29 has moved rightwardly in FIG. 3 to uncover passages 37, that such passages will communicate a chamber 38 containing springs 30 with a chamber 39 containing spring 28. Chamber 38 is further arranged to communicate with atmosphere via a vent means 40, preferably in the form of a spring loaded one-way check valve, to thus prevent chambers 38 and 39 from becoming hydrostatically locked. In addition, valve 40 prevents dirt or the like from entering the system.

Although the above described adjusting means is particularly adapted for use in a track-type tractor, it should be understood that this invention is not so limited. In other words, such adjusting means could be utilized to maintain a predetermined tension on various other types of endless belts. For example, the endless belt could comprise the endless ladder mechanism for a self-loading scraper or other types of conveyor belts.

We claim:

1. In an assembly (10) comprising an endless belt (11) trained about a drive sprocket (12) and an idler (13), said idler arranged on a frame (14) to be moved relative to said drive sprocket to hold said belt in tension thereon, resilient recoil means (21) arranged between said idler and frame for absorbing shocks imparted to said idler during operation, the improvement comprising adjusting means, including a cylinder connected with said resilient recoil means (16) for automatically and continuously urging said idler away from said drive sprocket with a predetermined force to constantly maintain a pre-set tension on said endless belt, said adjusting means comprising spring actuated pressurizing means (29, 30) arranged to operate independently of relative movement occurring between said idler and frame for maintaining the fluid pressure in a first chamber means (31) at a substantially constant first pressure level during operation, a second chamber means (25) having fluid maintained therein at a substantially constant second predetermined pressure level lower than said first pressure level and valve means (26) for communicating said first and second chamber means to raise the fluid pressure in said second chamber means to said second pressure level when the pressure in said second chamber means drops below said second pressure level whereby wear of said drive sprocket and idler is continuously compensated for during the normal life of said assembly to maintain said pre-set tension.

2. The invention of claim 1 wherein said endless belt constitutes an endless track and is arranged on a track-type tractor.

3. The invention of claim 1 wherein said pressurizing means comprises an accumulator piston (29) and spring means (30) arranged to urge said accumulator to pressurize said first chamber means.

4. The invention of claim 3 wherein said accumulator piston is cylindrically shaped and slidably mounted within a housing (22) of said adjusting means.

5. The invention of claim 3 further comprising vent means (40) for venting a chamber (38) containing said spring means to prevent hydrostatic locking of said accumulator piston.

6. The invention of claim 1 wherein said valve means is reciprocally mounted in a housing of said adjusting means and further comprising spring means (28) biasing said valve means towards an open position communicating said first and second chamber means.

7. The invention of claim 6 further comprising passage means (37) for communicating a chamber containing said spring means with a vent means (40) for preventing hydrostatic locking of said valve means.

8. The invention of claim 1 further comprising means (35, 36) for emptying said first and second chamber means.

References Cited

UNITED STATES PATENTS

| | | | |
|---|---|---|---|
| 2,818,311 | 12/1957 | Ashley | 305—10 |
| 2,959,451 | 11/1960 | Weber | 305—10 |
| 3,098,397 | 7/1963 | Schaefer | 305—10 |
| 3,101,977 | 8/1963 | Hyler | 91—433 X |

RICHARD J. JOHNSON, *Primary Examiner.*